United States Patent
Subramanian

(10) Patent No.: US 7,515,584 B2
(45) Date of Patent: Apr. 7, 2009

(54) SWITCHING DATA PACKETS IN AN ETHERNET SWITCH

(75) Inventor: Ramakrishnan Venkata Subramanian, Singapore (SG)

(73) Assignee: Infineon Technologies AG, Munich (DE)

( * ) Notice: Subject to any disclaimer, the term of this patent is extended or adjusted under 35 U.S.C. 154(b) by 902 days.

(21) Appl. No.: 10/665,988

(22) Filed: Sep. 19, 2003

(65) Prior Publication Data

US 2005/0063376 A1    Mar. 24, 2005

(51) Int. Cl.
*H04L 12/50* (2006.01)
*H04L 12/56* (2006.01)
*G06F 12/00* (2006.01)

(52) U.S. Cl. .............. 370/382; 370/395.7; 711/170

(58) Field of Classification Search ......... 370/381–383, 370/389, 391, 392, 400, 401, 412–429; 711/170–173
See application file for complete search history.

(56) References Cited

U.S. PATENT DOCUMENTS

| | | | | |
|---|---|---|---|---|
| 5,261,059 A | * | 11/1993 | Hedberg et al. | 710/317 |
| 5,289,470 A | * | 2/1994 | Chang et al. | 711/173 |
| 5,721,955 A | * | 2/1998 | Cedros et al. | 710/33 |
| 5,974,518 A | * | 10/1999 | Nogradi | 711/173 |
| 6,032,190 A | * | 2/2000 | Bremer et al. | 709/238 |
| 6,044,419 A | * | 3/2000 | Hayek et al. | 710/57 |
| 6,557,053 B1 | * | 4/2003 | Bass et al. | 710/29 |
| 6,721,273 B1 | * | 4/2004 | Lyon | 370/235 |
| 7,003,597 B2 | * | 2/2006 | Georgiou et al. | 710/56 |
| 7,177,276 B1 | * | 2/2007 | Epps et al. | 370/230 |
| 2003/0016689 A1 | | 1/2003 | Hoof | |

FOREIGN PATENT DOCUMENTS

| | | |
|---|---|---|
| WO | WO01/017178 | 3/2001 |
| WO | WO02/009364 | 1/2002 |
| WO | WO02/093833 | 11/2002 |

\* cited by examiner

*Primary Examiner*—Hong Cho
(74) *Attorney, Agent, or Firm*—Slater & Matsil, L.L.P.

(57) ABSTRACT

An Ethernet data switch maintains one or more queues for each of its ports in a shared memory. The memory is divided into data packets. When a data packet is received, the switch checks whether it can be stored efficiently in the packet buffers, and if the packet cannot be stored efficiently then a portion of the packet is stored in a separate memory and the remaining portion of the packet is stored in the packet buffers.

2 Claims, 2 Drawing Sheets

SWITCHING DATA PACKETS IN AN ETHERNET SWITCH

FIELD OF THE INVENTION

The present invention is related to data switches, particularly Ethernet switches.

BACKGROUND OF INVENTION

Conventionally Ethernet switches are provided in networks, such as LANs (Local Area Networks) including a plurality of computer units, each of which is associated with a respective MAC address. A data switch such as an Ethernet switch includes a plurality of ingress/egress ports and a switching fabric between them. Data packets arriving at one of the ports have a header containing the MAC address of the computer unit which transmitted the data packet and the MAC address of the destination of the data packet. The Ethernet switch gradually learns associations between incoming MAC addresses and ports, so that it can transmit the data packet to the port corresponding to the destination MAC address.

According to what data packets arrive at a switch, a data packet arriving at a given port may be queued until it can be transmitted. For this reason, the ports each include one or more queues for storing packets. The buffers for different ones of the ports are typically implemented in a single memory device, which may be a RAM memory.

This situation is illustrated in FIG. 1, which shows a shared memory 1 for storing data packets, in one or more queues for each of multiple ports. The packets stored may be identical to the data packets received at the switch, or they may be modified, e.g. with a different header. The memory 1 is structured to include sixteen packet buffers, labeled PB1, . . . PB16. Typically the number of packet buffers is much higher than this. Each of the packet buffers has the same size, referred to here as the PB length. Typically, this may be 256 bytes or 512 bytes.

Suppose that four packets of differing lengths are transmitted successively to the switch. These packets are illustrated schematically in FIG. 2 as packets 5,7,9,11, with each packet being shown with a different respective hashing scheme. The horizontal axis of FIG. 2 labels the lengths of the packets 5, 7, 9, 11 in units of the PB length.

Conventionally, these packets will be stored in the memory 1 as illustrated in FIG. 3, where the hashing corresponds to FIG. 2 to indicate which of the packets are stored in which of the packet buffers. The first packet, packet 5, for example, which is slightly less than twice the PB length, is stored in PB1 and part of PB2. The second packet, packet 7, which is just more than one PB length, is stored in PB3 and part of PB 4. Note that, a given packet buffer does not store data from more than one packet. This means that the memory utilization is not efficient, and resources are wasted, and the performance of the switch can be degraded. For example, if a packet is only 4 bytes longer than twice the PB length, then three whole packet buffers will be required to store it. If the switch runs out of memory 1, the switch may have to refuse to accept new ones which reach it, and packets may be lost.

It is known to address this problem by attempting to optimise the sizes of the packet buffers, but these techniques are only successful to a limited degree, since certain of the packets may use these resources inefficiently.

SUMMARY OF THE INVENTION

The present invention aims to provide a data switch which stores data packets more efficiently.

In general terms, the present invention proposes that, upon a data packet being received, the switch checks whether it can be stored efficiently in the packet buffers, and if the packet cannot be stored efficiently then a portion of the packet is stored in a separate memory and the remaining portion of the packet is stored in the packet buffers.

Specifically, one expression of the invention is a data switch having a plurality of ports, and a switching fabric for transferring data packets received at one of the ports to another of the ports specified by a header of the data packet, each of the ports being associated with one or more queues for data packets, the data switch further including:

a memory divided into packet buffers;

a plurality of registers;

a control unit for determining whether a data packet to be stored in one of the queues meets a criterion for efficient storage in the packet buffers, and otherwise dividing the data packet into a first portion which is stored in the packet buffers and a second portion which is stored in the register.

Preferably, the criterion for efficient storage is whether the length of the data packet is greater by more than a threshold than an integer multiple of the size of the packet buffers. Here the term "integer" is used to include zero as one of its possible realisations. In other words, the criterion is applied also to data packets which have a size less than that of a packet buffer: the criterion in that case is simply whether the size of the packet is, or is not, above the threshold.

The threshold value may be predetermined, or may be programmable. In the latter case, the data switch may include a memory storing the threshold value.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
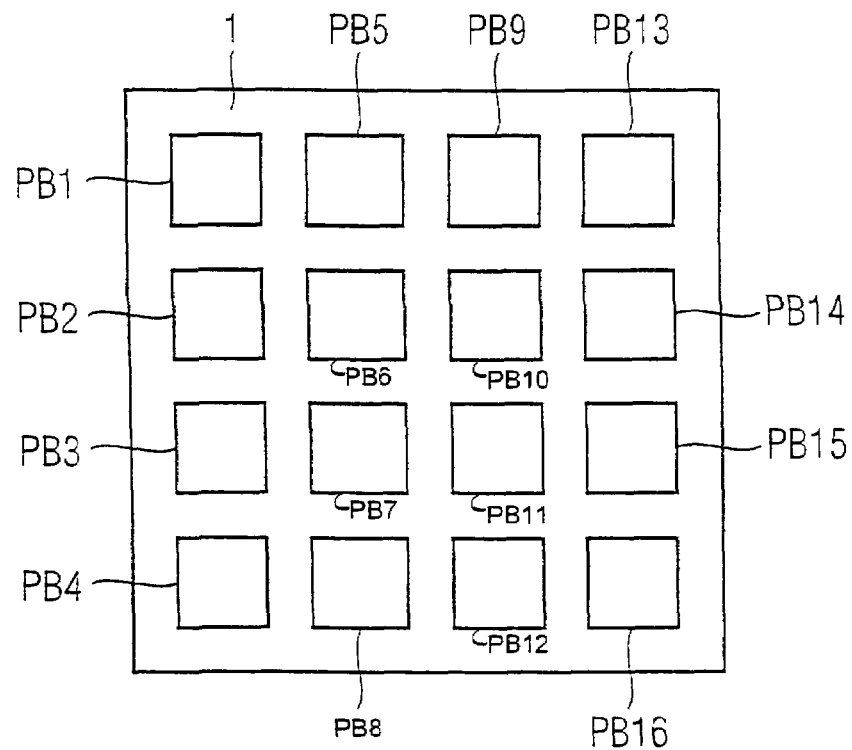
FIG. 1 illustrates a packet storage mechanism used in a known data switch.
Figure 4:
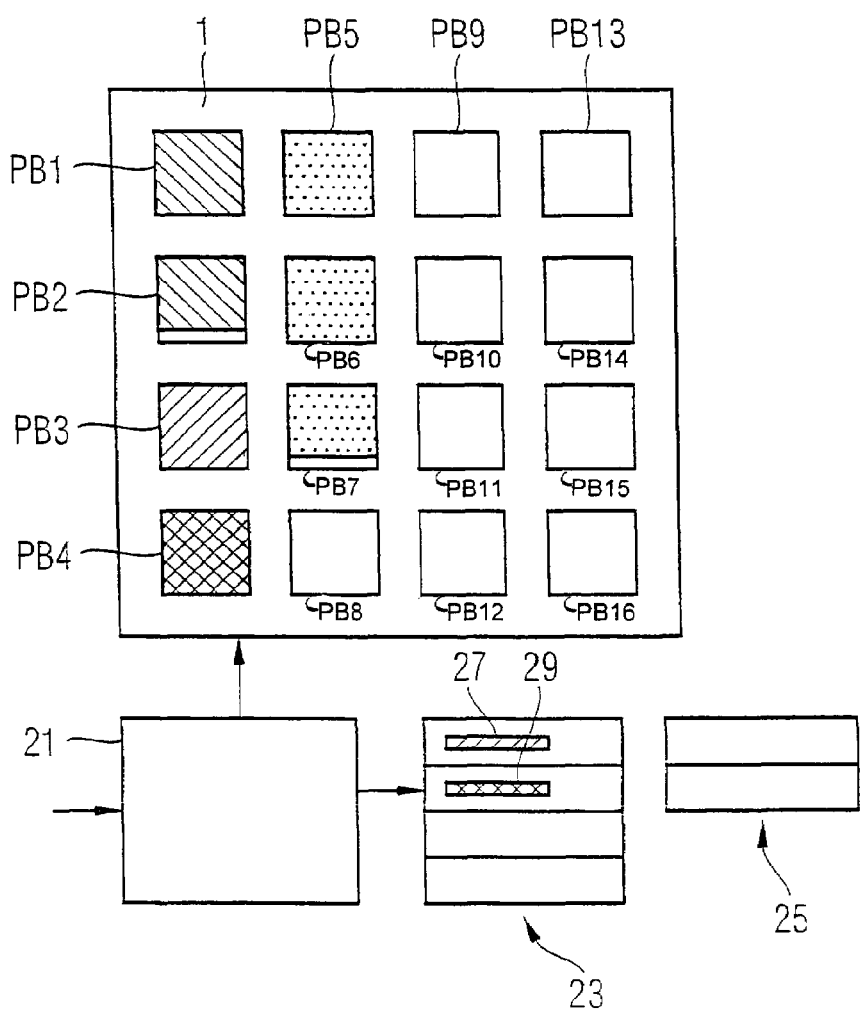
FIG. 4 illustrated schematically a packet storage mechanism of a data switch according to the invention.

The overall structure of packet storage mechanism in a data switch according to the invention is illustrated in FIG. 4. The mechanism includes a memory 1 having the configuration of FIG. 1, but in addition a control state machine 21 and a set of storage registers 23 and status registers 25. The memory 1 preferably functions as a shared memory for one or more queues of a plurality of ports. The control state machine 21 monitors data packets transmitted to the mechanism, and controls whether they are stored wholly in the memory 1 or partly in the registers 23.

Figure 2:
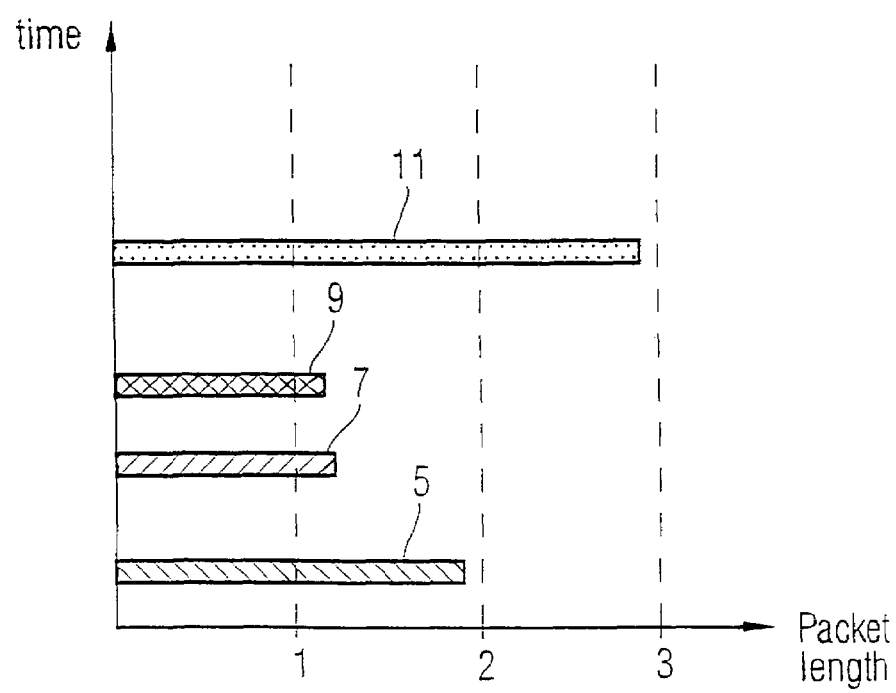
FIG. 2 illustrated four data packets input to this switch.

In a first possible form of the switch, when a data packet arrives at the switch, it may initially be written the memory 1 in the manner described above in relation to FIG. 2. That is, it is written to the lowest-numbered packet buffer(s) which are completely empty. In this case, it may fill one of more of the packets completely, and usually leaves a last packet buffer only partly full. The control state machine 21 checks the last packet buffer, and determines the number of bytes contained there. If the number of bytes is low (e.g. low compared to a threshold) the control state machine 21 transfers the data from the last packet buffer to the set of registers 23, thus emptying that packet buffer. The threshold may be fixed (e.g. at 4 bytes, 8 bytes, 16 bytes or 32 bytes) or it may be programmable, i.e. controlled by a value stored in a further memory (not shown in FIG. 4).

In an alternative possible form of the switch, when a data packet arrives the control state machine 21 monitors it on-the-fly, and measures that the data packet is larger than an integer multiple of the packet buffer size by an overflow amount less than the threshold. If so, it partitions the data packet into a first portion which is stored in the packet buffers (and which preferably has a size which is an integer multiple of the packet buffer size) and a second portion which is transmitted directly to the registers 23 for storage without being written into the memory 1. This means that the control state machine 21 does not have to copy data from the packet buffer memory 1 to the registers 23.

Figure 3:
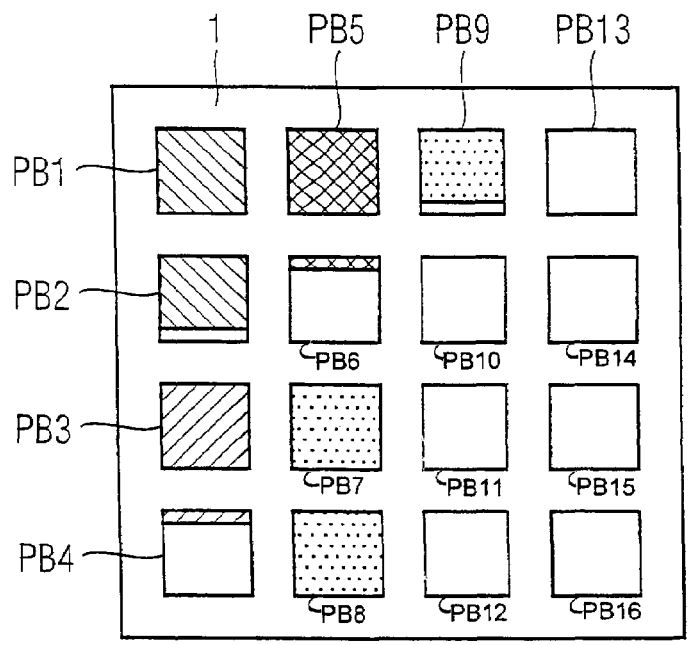
FIG. 3 illustrates how the packets of FIG. 2 are stored in the switch of FIG. 1.

Both forms of the invention achieve the same result. For example, the result of transmitting the data packets 5, 7, 9, 11 in turn to the packet storage mechanism of the invention is illustrated in FIG. 4. The data packet 5 is less than twice the size of the packet buffers, and thus is efficiently stored in the packet buffers PB1 and PB2, as in the prior art data switch of FIG. 3. However, the control state machine 21 determines that the packet 7 is more than one packet buffer length by an amount which is less than the threshold, and therefore divides the packet 7 into a first portion which is one packet buffer length and a second portion. The first portion is stored in the packet buffer PB3, and the second portion 27 is stored in the registers 23. Similarly, the third packet 9 is divided into a first portion which is stored in the packet buffer PB4 and a second portion 29 which is stored in the registers 23. The control state mechanism 21 determines that the final packet 11 has a length slightly less than three times the packet buffer length, and accordingly stores it in the three packet buffers PB5, PB6, PB7. Thus, comparing FIGS. 3 and 5, the embodiment is able to store the packets using seven packet buffers rather than nine.

The status registers are used to record which of the storage registers 23 have been used, and which packets they relate to. This information is used by the control state machine 21 when deciding which of the storage registers 23 should be used to store the second portions of new data packets. Specifically, when a new packet is to be stored, and when it is determined that a second portion of the packet is to be stored in the storage registers 23, the control state machine 21 uses the states stored in the status registers 25 to decide which of the storage registers 23 should be used to store that second portion. The status registers 25 are then updated.

The control state machine 21 is also operative to extract information from the packet buffers and the memory, in response to a read instruction. When a read instruction is received the control state machine 21 examines the status registers 25 to determine whether any of the storage registers 23 stores a part of the packet, and if so extracts the second portions of the packets from the storage registers 23. The control state machine 21 then transmits the first and second portions of the packets out of the packet storage mechanism in the correct order, and updates the status registers to indicate that the packet is no longer stored in the packet storage mechanism.

Note that the memory 1 is typically implemented as a RAM memory, which is a term which, as used in this field, does not include registers, such as the storage registers 23 and status registers 25.

A skilled reader will appreciate that other portions of the data switch than the packet queues may be implemented by any known system, such as according to the Ethernet standard.

Although only a single embodiment of the invention has been illustrated, the invention is not limited in this respect and many variations are possible within the scope of the invention as will be clear to a skilled reader.

The invention claimed is:

1. A data switch comprising:
   a plurality of ports;
   a switching fabric for transferring a data packet received at one of the ports to another of the ports specified by a header of the data packet, each of the ports being associated with one or more queues for data packets;
   a first memory divided into packet buffers;
   a second memory for storing a threshold value;
   a plurality of registers that are not included in the first memory and second memory; and
   a control unit for determining whether a data packet to be stored in one of the queues meets a criterion for efficient storage in the packet buffers, wherein
   if the size of the data packet is less than that of a packet buffer, the criterion for efficient storage is whether the size of the data packet is above the threshold value, and on a negative determination of the criterion, the control unit is arranged to store the data packet in at least one of the registers, and
   if the size of the data packet is greater than that of the packet buffer, the criterion for efficient storage is whether the size of the data packet is greater, by more than the threshold value, than a selected one of: the size of the packet buffer and the size of a plurality of packet buffers combined, and on a negative determination of the criterion, the control unit is arranged to divide the data packet into a first portion that meets the criterion and that is stored in the packet buffers, and a second portion that is stored in at least one of the registers.

2. A data switch according to claim 1 which is an Ethernet switch.

* * * * *